(No Model.)

A. W. FISHER.
THILL COUPLING.

No. 502,620. Patented Aug. 1, 1893.

Witnesses
Harry L. Amer.
Chas. S. Hyer.

Inventor
Ansel W. Fisher.
By his Attorneys,
C. A. Snow & Co.

UNITED STATES PATENT OFFICE.

ANSEL W. FISHER, OF CHARLOTTE, MAINE.

THILL-COUPLING.

SPECIFICATION forming part of Letters Patent No. 502,620, dated August 1, 1893.

Application filed May 2, 1893. Serial No. 472,656. (No model.)

*To all whom it may concern:*

Be it known that I, ANSEL W. FISHER, a citizen of the United States, residing at Charlotte, in the county of Washington and State of Maine, have invented a new and useful Thill-Coupling, of which the following is a specification.

This invention relates to thill-couplings, and has for its object to provide a perfectly safe device of the character set forth from which thills may be readily disconnected to apply a pole, or vice versa, without the use of a wrench, and that is intended to be used on all forms of vehicles and made in various sizes.

With these and other objects in view the invention consists of the construction and arrangement of the parts thereof as will be hereinafter more fully described and claimed.

Figure 1:
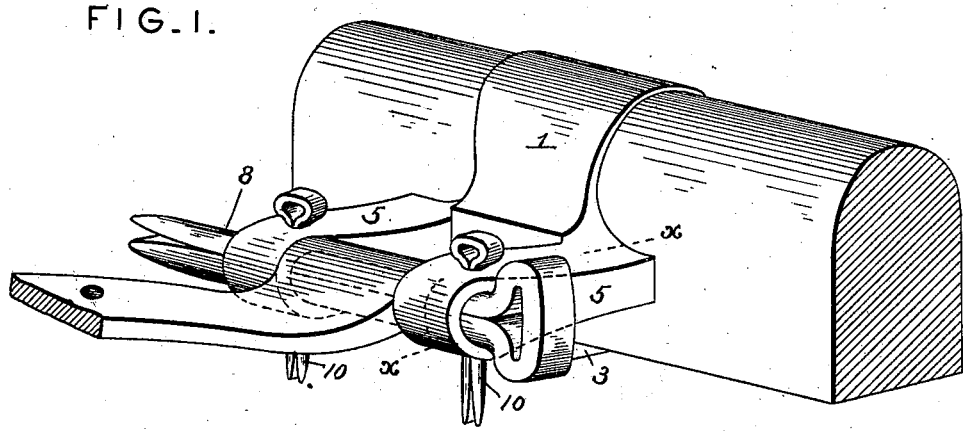
Figure 2:
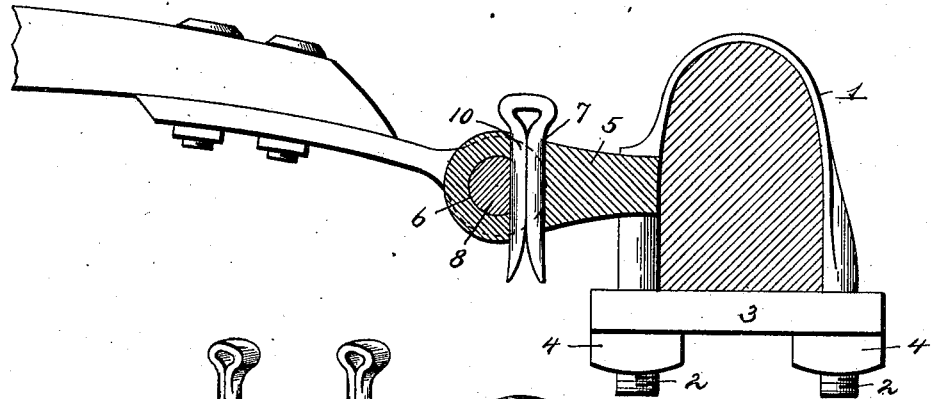
Figure 3:
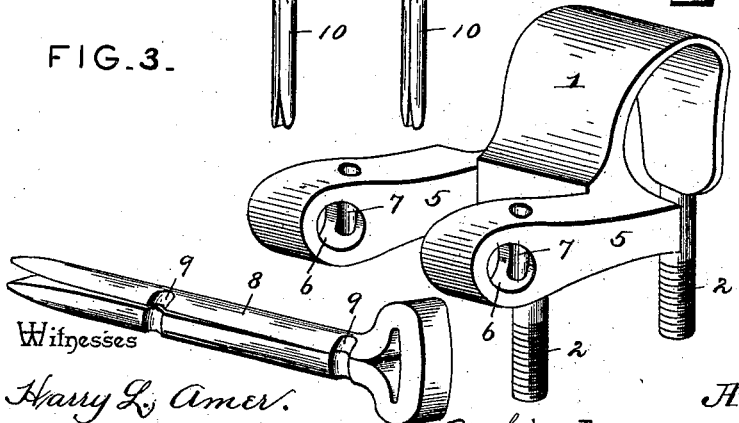

In the drawings: Figure 1 is a perspective view of a thill-coupling or shackle, shown applied and embodying the invention. Fig. 2 is a section on the line $x$—$x$, Fig. 1. Fig. 3 is a detail perspective view of the parts of the coupling or shackle separated from each other.

Similar numerals of reference indicate corresponding parts in the several figures of the drawings.

Referring to the drawings, the numeral 1 designates a clip that is arranged to embrace the axle or an adjacent part, having lower screw-threaded ends 2, to receive a tie-plate 3, that is held against the under side of the axle by nuts 4 engaging the lower screw-threaded ends 2. The front of the clip 1 is integrally formed with a pair of forwardly-projecting arms 5, that are arranged in a horizontal plane and spaced apart to permit the thill eye to be moved freely when mounted in connection with the coupling or shackle in order to take up and compensate for the movements of the animal, or to permit the thills or pole to be raised if desired. The said arms 5 are formed with transverse openings 6, at their outer ends, that align with each other, and vertical openings 7 are also formed in said arms slightly in rear of but communicating with said transverse openings. In the said transverse openings of the arms is removably mounted an enlarged split spring pin or bolt 8, that is arranged to pass through the eye of the thill or pole-iron and has the rear edge thereof formed with a pair of curved recesses 9, that align with the vertical openings 7, when the said pin or bolt is properly driven home in the said arms. In the said vertical openings 7 are removably mounted smaller split spring pins 10, that engage the said recesses 9, of the pin 8, to hold the latter in locked position in the arms 5 and prevent accidental disengagement of the said pin or bolt 8. By this means the eye of the thill or pole iron is securely held in position in connection with the coupling, and when it is desired to disconnect the thills to substitute a pole therefor it is only necessary to release the smaller split-pins from the arms 5, by the use of a hammer, and then drive out the larger split-pin 8, when the change can be quickly made.

It will be understood that one smaller pin could be used to secure the larger pin in the arms 5, if desired, without in anywise modifying or changing the construction, but it is of course preferred to use the double form of smaller pin in order to insure a more rigid and firm connection. It will also be understood that the improved device is intended for use upon any class of vehicles found desirable, and in such location as may serve the most useful function.

Any suitable and well-known form of anti-rattler may be employed with the improved device, and it is obviously apparent that changes in the form, proportion, and the minor details of construction may be resorted to without departing from the principle or sacrificing any of the advantages of this invention.

Having described the invention, what is claimed as new is—

1. In a thill-coupling, the combination of a clip having arms projecting forwardly therefrom that are spaced apart and have transverse openings therethrough with vertical openings communicating with said transverse openings, an enlarged spring-pin having recesses in the back thereof aligning with the vertical openings in the said arms and removably fitted in the said transverse openings of the said arms, and vertical pins removably seated in said vertical openings and engaging said recesses of the larger pin, substantially as described.

2. In a thill-coupling, the combination of arms having transverse openings extending therethrough, a split spring pin mounted in said transverse openings and arranged to be readily removed, and a vertical retaining pin of smaller form engaging the rear part of the aforesaid pin, substantially as described.

In testimony that I claim the foregoing as my own I have hereto affixed my signature in the presence of two witnesses.

ANSEL W. FISHER.

Witnesses:
GEORGE W. GOODWIN,
LOUIS HOLITSER.